WILLIAM JOHNSON.
Improvement in Pendulum-Levels and Clinometers.
No. 114,014. Patented April 25, 1871.
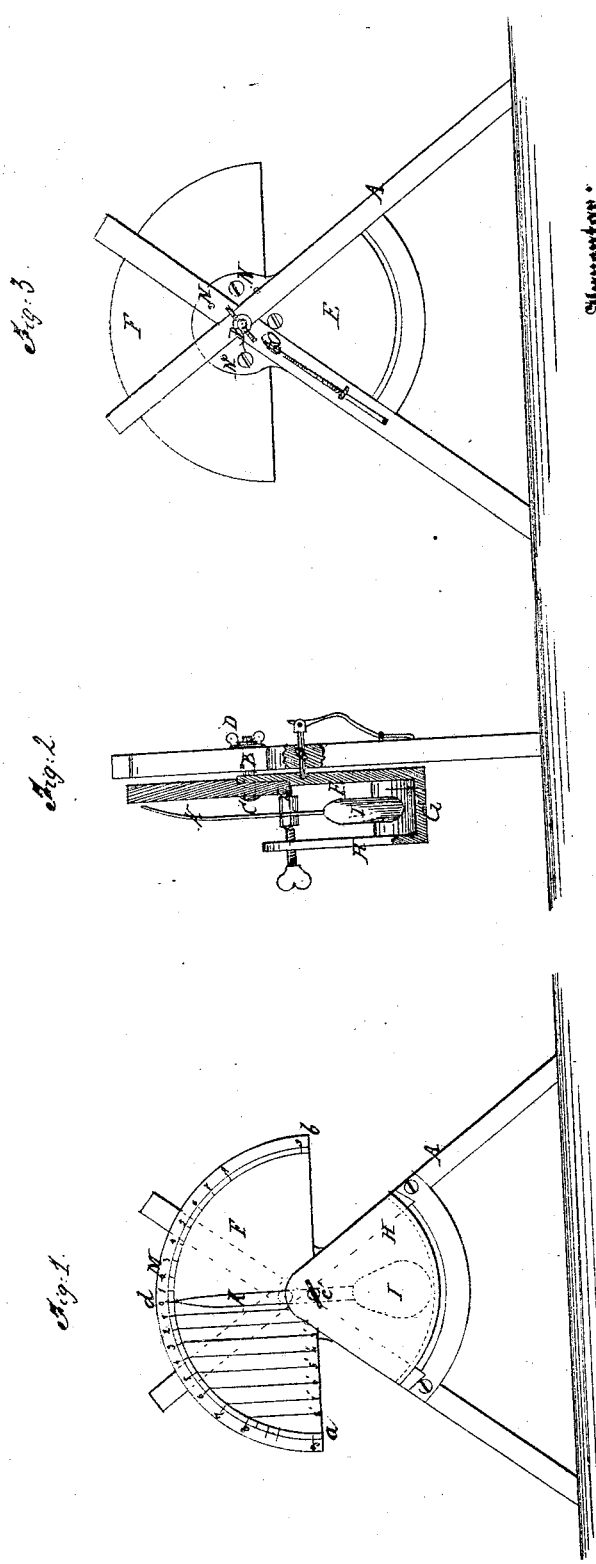

UNITED STATES PATENT OFFICE.

WILLIAM JOHNSON, OF EDISTO ISLAND, SOUTH CAROLINA.

IMPROVEMENT IN PENDULUM-LEVELS AND CLINOMETERS.

Specification forming part of Letters Patent No. 114,014, dated April 25, 1871.

*To all whom it may concern:*

Be it known that I, REV. WILLIAM JOHNSON, of Edisto Island, South Carolina, have invented a new and Improved Altimeter; and I do hereby declare that the following is a full, clear, and exact description thereof, which will enable others skilled in the art to make and use the same, reference being had to the accompanying drawings, forming part of this specification.

This invention relates to improvements in instruments consisting of a stand, pendulum-pointer, and scale, such as are used for ascertaining the deviations of the earth's surface or the surfaces of other objects from a horizontal line; and consists in certain improvements in the construction and arrangement of the same calculated to adapt it for use as a plumb in determining the lines of objects standing vertically or nearly so and of overhead walls or ceilings; but the most distinctive feature of my invention is that of arranging the scale relatively to the height and stretch of the forked measuring-legs of the stand, so that measurements in right lines vertically to the inclinations of the surface may be indicated with precision on the curve which the index describes.

Figure 1 represents a front elevation of my improved instrument. Fig. 2 represents a vertical transverse section; and Fig. 3 represents a rear elevation.

Similar letters of reference indicate corresponding parts.

A is a frame made in the form of two legs of a compass crossing each other at B. C is a bolt passing through this frame at the point B, from front to rear, and provided at the rear with a thumb-nut, D.

E is a plate of metal suspended from the bolt C at the front of the frame. In this example this plate is represented as of A shape, with a circular enlargement around the vertex, through which the bolt passes and to which a semicircular scale-board, F, is so connected that the axial line will be parallel with the line of the surface on which the feet of the frame may stand, the curved edge being highest; but I propose in practice to form these two plates in one, making them preferably of cast-iron; and I propose to make the plate E nearly semicircular. At the base of this plate is a curved flange, G, supporting another A-shaped plate, H, parallel with the plate E. These two plates and the flange G form a case, wherein the pendulum I of the pointer K is suspended and protected in a great measure from the action of the wind, which case will be more or less efficient according to the proportion it forms of a semicircle.

The said pointer K is suspended on pivots at L, below the bolt C, so as to vibrate freely to move the pointer over the scale M on the curved margin of the board F.

The plate E is provided at the rear side with four holes, N, at equal distances around a circle, and a spring-pin, O, passing through the frame from the rear side is arranged to take into the said holes to hold the plates E F and the pendulum on the frame, so as to permit the use of the instrument either on the surface of the earth or other objects below, or on surfaces above, or surfaces vertical thereto, the plates E F being arranged for turning on the bolt C freely—viz., when it is required to alter the adjustment of the instrument for its various applications, it is necessary only to draw out the spring-pin O so far as to disengage it from the hole in the plate, when the plate may be turned on the bolt C as many quarters as required, where it will find another hole in the plate, entering which it secures the plate.

Any other preferred means for holding the plates E F relatively to the frame may be used instead of the pin and holes, but this I prefer as simplest.

The mode of dividing the scale is as follows: With a radius equal to the distance from the point of pendulum on which it turns to the point which serves as index, describe the semicircle $a\ b$. Bisect it in $d$, and draw $c\ d$ from center $c$. Consider $a\ c$ to be the sine of ninety degrees—therefore equal to radius, say, for example, three inches. Divide the sine $a\ c$ into as many equal parts as the number of inches strided by the compass or legs A to which the scale is to be attached, say nine inches. The sine is therefore divided into the parts 1' 2' 3' 4' 5' 6' 7' 8' 9. Corresponding divisions must be made of the quadrant $a\ d$. This is done by drawing lines perpendicular to $a\ c$ from the divisions 1' 2', &c. Their intersections with the arc give the divisions of the arc.

If subdivisions are desired, (say, fourths,) they also must be set off on the sine, as shown, between 8' and 9, and carried to the arc, as above. The scale in that case would have five concentric arcs. At each division 1 2, &c., the mark must be drawn from the innermost to the outermost arc; but at the subdivisions they must terminate on the first, second, or third arc, as they may designate $\frac{1}{4}$ $\frac{2}{4}$ $\frac{3}{4}$, as shown, between 8 and 9. The figures 1 2, &c., which are here placed on the innermost, would then be placed on the outermost, arc. In the quadrant $d\,b$ the divisions and subdivisions are to be arranged the same as in the quadrant $a\,d$, by measuring each from 0, as $0^1$ on $a\,d$ set off as $0^1$ on $d\,b$, $0^2$ as $0^2$, $0^3$ as $0^3$, &c.

It will be seen that between 8 and 9 on the scale the distance is greater than that between 7 and 8, and that the latter is greater than that between 6 and 7, &c. Now, if the feet of the compass (the instrument being arranged for horizontal applications—i. e., for determining all departures from the horizontal line as far as the vertical) be set on a horizontal surface the index will be at 0. Let one foot then be held in the same place and the other be raised one inch, (measured on a square resting on one of its edges, so as to insure the other being perpendicular to the horizon,) the index will move to 1, and so on through all the divisions; and it will be seen that when the foot raised ascends one inch on the square the index has passed over the space on the scale from 0 to 1; and, if still tested by the square, the foot of the compass be moved through the ninth inch, the index will move from 8 to 9, although that space is more than four times the space between 0 and 1.

Having thus described my invention, I claim as new and desire to secure by Letters Patent—

An improved altimeter consisting of two crossed bars, A, a pendulum-pointer, I K, and the arc-plate E, combined with the semicircular plate F, having the diameter $a\,b$ and the semi-circumference M correspondingly graduated, the said parts being constructed and relatively arranged and adjusted, as and for the purpose described.

REV. WM. JOHNSON.

Witnesses:
R. L. JOHNSON,
T. P. MIKELL.